Sept. 4, 1956 R. H. NEWELL 2,761,892
WELDING CABLE COUPLING OR CONNECTION
Filed Oct. 27, 1950
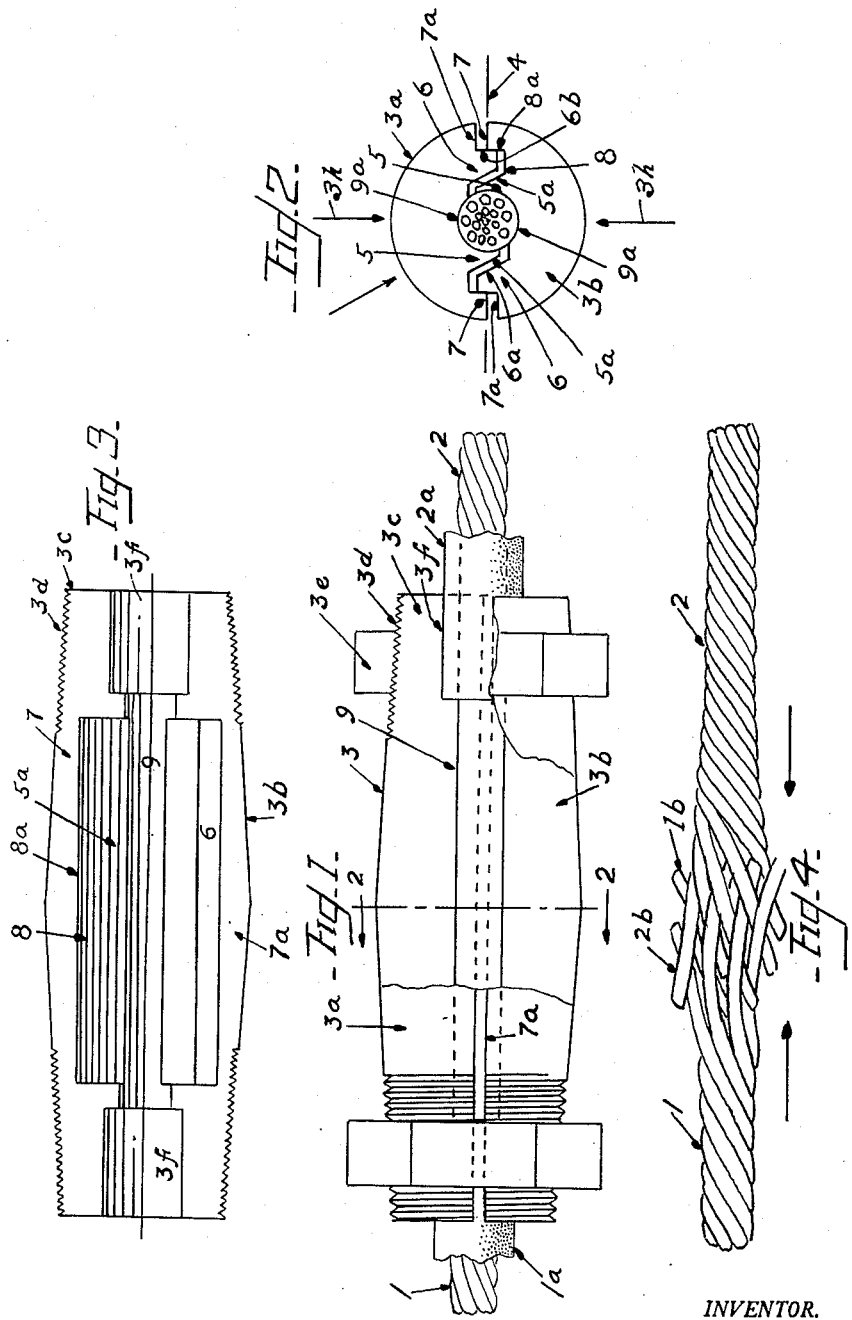
INVENTOR.
ROBT. H. NEWELL
BY
Francis D. Ammen
Atty.

United States Patent Office 2,761,892
Patented Sept. 4, 1956

2,761,892
WELDING CABLE COUPLING OR CONNECTION
Robert H. Newell, Lynwood, Calif.
Application October 27, 1950, Serial No. 192,413
2 Claims. (Cl. 174—92)

This invention relates to a connection or coupling for connecting sections of a welder's cable. As is well known these cables carry current to the welder's rod, under high amperage and voltage and unless a good conductive connection and contact is effected between the ends of the cable sections, such couplings are apt to become hot. This of course, is avoided if there is ample contact area between the strands of the two cable sections that are in contact with each other.

Furthermore, although welding cables usually lie upon the ground or floor upon which the welding operations are taking place they are occasionally dragged along the floor, which subjects them to some tension. So, such a coupling in addition to providing insulation, should have a construction which will enable it to maintain its connection between the cable sections even when the cable is subjected to a reasonable amount of tension.

Some welding cable connections are employed, the bodies of which are not composed of insulating material, and must therefore be wrapped with insulating tape to provide the necessary insulation.

One of the objects of this invention is to produce a welding cable connection or coupling which will fulfill the practical requirements as to insulation, and which is so constructed that it will enable the ends of the cable sections that are conductive to be firmly pressed together, and to have an ample area of contact with each other.

Another object of the invention is to provide a cable coupling of this type in the form of a sleeve divided longitudinally into sections which when brought together in their proper relation will form a chamber or bore for the metalic cable ends, said sections being provided with means for maintaining the same in proper alignment with each other, and provided also with clamping means for forcing the sections inwardly to grasp the metal of the cable, and also its insulated sheath, the parts being so constructed as to insure ample adjustment and "follow-up" when the coupling sections are being drawn together.

Another object of the invention is to form the cable sections in such a way that they are capable of being formed or molded from the same pattern; in other words, in a coupling embodying my invention, composed of two sections, the inner faces or meeting faces are so formed that when one of the sections is applied as a cover on the other section, projecting parts on one of the sections will be juxtaposed to corresponding grooves or recesses in the lower section.

Another object of the invention is to provide the two segments or sections of the coupling with a cross-section that provides yielding circumferential tongues that will be forcibly pressed inward against the metalic cable core as the sectional parts of the coupling are forced together.

Further objects of the invention will appear from the following disclosures.

The invention consists in the novel parts and combinations of parts to be described hereinafter, all of which contribute to produce an efficient welding cable coupling.

A preferred embodiment of the invention is described in the following specification, while the broad scope of the invention is pointed out in the appended claims.

In the drawing:
Fig. 1 is a side elevation and partial section through the coupling body, and showing the sections of cable ends broken away that are connected.
Fig. 2 is a cross section through the parts taken on line 2—2 of Figure 1.
Figure 3 is a plan view of the lower section of the coupling body.
Fig. 4 is a view illustrating the way the strands at the ends of the metallic cable are arranged to adapt them for having the coupling applied to them, so as to insure the establishment of ample contact area between the two cable ends.

Referring to Fig. 1, 1 and 2 indicate the cable ends that are to be united by my coupling.

While my invention may be practiced with a coupling composed of more than two sections, in the present drawing I have illustrated the invention as applied to two sections, 3a and 3b. These sections are preferably composed of insulating material, such as an insulating moldable plastic material. These two sections are constructed so that they can meet together on the diametrical line 4, shown in Fig. 2; and the meeting faces of the two sections have a configuration such that projections and recesses on the two meeting faces are correlated in such a way that when the two sections are drawn together a clamping effect will be developed on the sides of the cable core that are remote from the diametrical plane indicated by the line 4, not only that is, in a plane substantially at right angles to the plane indicated by the line 4, but also in a plane coinciding in a general way with the location of the diametrical plane indicated by the line 4.

On the diametrical line that extends at right angles to the line 4 the two sections of the sleeve out of which the body of the coupling is made, the meeting faces of the two sections are formed with two substantially half round grooves 9a, and when the two sections 3a and 3b are united these two grooves form a bore or socket 9 for the cable ends (see Fig. 1), located on the longitudinal axis of the coupling, and the diameter of which is substantially the same as that of the metal core of the cable, the ends of which are to be connected. At its ends the coupling bore 9 is formed with a counter bore 3f (see Fig. 1) which has a diameter slightly smaller than the diameter of the sheath ends 1a and 2a of the insulation enveloping the metallic cable.

In practicing the invention I provide an elongated coupling composed of sections that have meeting faces that co-operate to form a bore located on the axis of the coupling, and this bore receives the interlaced strands of the cable ends. In addition to this, the abutting faces of the sections are provided with correlated means for preventing the sections from shifting longitudinally or laterally with respect to each other; and means are provided for drawing the sections together to clamp the cable ends firmly in contact with each other.

Referring now particularly to an embodiment of the invention shown in Fig. 2, the lower section 3a is formed with an upwardly projecting inclined tongue 5 having an inclined face 5a, the material forming this tongue being disposed between the inclined face 5a and the concave inner face of the tongue that constitutes a portion of the groove 9a.

On the opposite side of the cable a similar inclined tongue 5 projects downwardly from the upper section 3b having an inclined face 5a on its outer side that extends parallel with the aforesaid inclined face 5a.

Furthermore, the upper section 3b is provided with a downward projection or rib 6 that, like the tongues 5 has a tapered cross-section, and extends throughout substantially two-thirds of the entire length of the coupling, and located at its middle portion; and this rib has a counterpart 6 on the lower section of the coupling; and both of these longitudinally extending ribs 6 present a tapered cross-section, that is to say, inclined faces 6a are presented that are inclined so as to lie parallel with the inclined faces 5a and disposed near them but not touching them, so that a substantial amount of clearance space lies between these two faces. In view of the fact that when two sections 3a and 3b are drawn together in a vertical direction as indicated by the two vertical arrows in Fig. 2, it is evident that the actual clearance must be measured by the distance between the intersections of a vertical line drawn between the faces 5a and 6a, with these two faces. In addition to this, clearance space is provided on each section 3a and 3b at the points where the ends of the tongues 5 approach the adjacent faces located at the bottoms of the grooves that are formed between the inclined faces 6a and the side of the cable ends.

In addition to this the two cable sections 3a and 3b are provided with means on their meeting faces for guiding them toward each other in a vertical direction (as indicated in Fig. 2). In order to accomplish this and at the same time to provide necessary clearance, each of the meeting faces is provided with a rabbet groove 7 so that 2 faces 7a are formed located away from the diametrical plane indicated by the line 4; and opposite to the faces 7a each opposing section is provided with similar diametrically opposite face 7b. When the rabbet grooves 7 are cut, faces 6b are formed at the inner sides of the grooves which are in planes at right angles to the diametrical plane indicated by the line 4, and when the two sections 3a and 3b are brought together these faces 6b fit neatly against guide faces 8a formed in the opposite section, and also at right angles to the diametrical plane 4. These faces 8a are the size of a groove 8 that is cut down into each section opposite the tongue 6 of the opposing section.

All of the tongues and grooves that co-operate with them preferably extend throughout two-thirds the entire length of the coupling. Suitable means is provided for drawing the two sections of the coupling toward each other.

In Fig. 4 I illustrate roughly the procedure that is followed in order to prepare the cable ends for being united by the coupling. Welding cables are composed practically always of helically wound strands such as the strands 1b and 2b, illustrated in Fig. 4. These strands 1a and 2a are themselves composed of relatively finer strands. This is characteristic of welding cables. The procedure that I prefer to employ is to ravel out the relatively finer strands of the cable ends to give them the form approximately of a relatively long "conical brush" and then to jam the two cable ends together with their axes coinciding so that the strands of one cable overlap those of the other. (See Fig. 4.) In this way a "tangle" or more or less "cylindrical mat" is formed of the interlaced or commingled strands. This "mat" should then be rolled in the operator's gloved hands to give the same an approximately neatly cylindrical cross section that should be of slightly larger diameter than the cable ends.

That "mat" of the cable is then laid in the groove 9a of the lower section at about its middle point; the upper section is then applied to the lower section 3a by moving it in the direction indicated by the inclined arrow 3g and vertical arrow 3h above the upper section 3b as shown in Fig. 2. In doing this the faces 5a and 6a may be applied to each other so that the ribs or tongues 5 approach the tongues 6 by a movement parallel to the inclined faces 5a and 6a. This movement can continue until the faces 6b and 8a come together. When this stage of the operation is reached the coupling sections are in a relative position which will enable them to be drawn together by clamping nuts 3e received over the tapered threaded ends of the coupling. The action of the nuts can be assisted by exerting pressure against the coupling members 3a and 3b in the direction indicated by the arrows 3h.

The diameter of the bores 9 and 3f should depend, of course, upon the diameter of the metallic cable ends 1 and 2 and the thickness of the sheaths 1a and 2a. In other words, the bore at 9 and 3f should be proportioned so that when the bore 3f is tight on the sheath the cable "mat" will be compressed down to have substantially the diameter that will fit tight into the bore 9.

It is evident that the total area of contact effected when the two "brushes" of unravelled strands are telescoped together in a "mat" as indicated in Fig. 4 is relatively great, and when the coupling sides are clamped up the contacts are made firmer and their contact areas are even increased. These conditions are very favorable to high conducting efficiency between the two telescoped cable ends.

Also in designing the coupling the thread 3d on the coupling should extend far enough upon the taper of the ends to insure that the nut will not run off the thread in tightening them up.

As the grooves and the ribs that nest into them are about the same length so they co-operate to hold the sections of the coupling against relative shifting, and in their proper position when the threads are being cut on the tapered ends.

I claim as my invention and desire to secure by Letters Patent:

1. In a welding cable connection, the combination of two aligning welding cable ends each composed of a plurality of helical wound smaller cables, each of said last named smaller cables composed of a plurality of relatively finer strands, said cable ends telescoped together and forming a tangled mat composed of the said finer strand extending respectively in opposite directions and commingled together, a plurality of coupling sections composed of insulating material having grooves on their adjacent faces for receiving and encompassing said mat, said coupling sections having tapered threaded ends; and a threaded nut mounted on each end of the coupling operating when screwed up on said tapered ends to compress said relatively finer strands into firm contact with each other, thereby establishing a relatively large area of contact between said cable ends through said mat.

2. A welding cable connection according to claim 1, in which the said threaded nuts are composed of metal insulated from the cable ends by the insulating material of which said coupling is composed, said nuts having tapered, threaded openings through the same fitting substantially to the taper of the ends of said coupling.

References Cited in the file of this patent
UNITED STATES PATENTS

| | | |
|---|---|---|
| 297,927 | Goebel | Apr. 29, 1884 |
| 397,221 | Callender | Feb. 5, 1889 |
| 964,969 | Hesterhagen | July 19, 1910 |
| 1,620,693 | Royal | Mar. 15, 1927 |
| 1,701,094 | Becker | Feb. 5, 1929 |
| 1,751,572 | Beemer | Mar. 25, 1930 |
| 1,799,340 | Wiegand | Apr. 7, 1931 |
| 2,130,825 | Bergan | Sept. 20, 1938 |
| 2,475,184 | Hudson | July 5, 1949 |